(12) United States Patent
Yakushev et al.

(10) Patent No.: US 11,416,452 B2
(45) Date of Patent: *Aug. 16, 2022

(54) DETERMINING CHUNK BOUNDARIES FOR DEDUPLICATION OF STORAGE OBJECTS

(71) Applicant: INTERNATIONAL BUSINESS MACHINES CORPORATION, Armonk, NY (US)

(72) Inventors: Mark L. Yakushev, San Jose, CA (US); Mark A. Smith, Los Gatos, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 344 days.

This patent is subject to a terminal disclaimer.

(21) Appl. No.: 16/559,620

(22) Filed: Sep. 3, 2019

(65) Prior Publication Data

US 2019/0391962 A1 Dec. 26, 2019

Related U.S. Application Data

(63) Continuation of application No. 14/698,720, filed on Apr. 28, 2015, now Pat. No. 10,565,166, which is a (Continued)

(51) Int. Cl.
*G06F 16/00* (2019.01)
*G06F 16/174* (2019.01)
(Continued)

(52) U.S. Cl.
CPC ........ *G06F 16/1752* (2019.01); *G06F 16/152* (2019.01); *G06F 16/1748* (2019.01); *G06F 16/951* (2019.01)

(58) Field of Classification Search
CPC ............ G06F 16/1752; G06F 16/1748; G06F 16/951; G06F 16/152
See application file for complete search history.

(56) References Cited

U.S. PATENT DOCUMENTS 7,747,584 B1  6/2010  Jernigan, IV
7,797,323 B1  9/2010  Eshghi et al.
(Continued)

FOREIGN PATENT DOCUMENTS

| CN | 101706825 A | 5/2010 |
|---|---|---|
| CN | 102156727 A | 8/2011 |
| WO | 2010045262 A1 | 4/2010 |

OTHER PUBLICATIONS

Manogar, E., and S. Abirami. "A study on data deduplication techniques for optimized storage." 2014 Sixth International Conference on Advanced Computing (ICoAC). IEEE, 2014.*
(Continued)

*Primary Examiner* — Nan Hutton
(74) *Attorney, Agent, or Firm* — Konrad Raynes Davda & Victor LLP; David W. Victor

(57) ABSTRACT

Described are a method, system, and computer program product for deduplicating a storage object. A hash of a window of data of a storage object is determined and a determination is made as to whether the window of data of the storage object corresponds to a chunk boundary. A determination is made as to whether the hash of the object matches one pseudo fingerprints in a list of at least one pseudo fingerprint. A storage object chunk boundary based on the window of data is stored in response to the window of data corresponding to the chunk boundary or in response to determining that the hash of the object matches one of the pseudo fingerprints. A determination is made of a new window of data in the storage object following the window
(Continued)

of data when the window of data is not an end of data of the storage object.

21 Claims, 6 Drawing Sheets

Related U.S. Application Data continuation of application No. 13/305,218, filed on Nov. 28, 2011, now Pat. No. 9,047,304.

(51) Int. Cl.
  *G06F 16/14* (2019.01)
  *G06F 16/951* (2019.01)

(56) References Cited

U.S. PATENT DOCUMENTS

| | | | |
|---|---|---|---|
| 7,827,137 | B2 | 11/2010 | Patterson |
| 7,950,062 | B1 | 5/2011 | Ren et al. |
| 8,983,952 | B1 | 3/2015 | Zhang et al. |
| 2005/0262167 | A1* | 11/2005 | Teodosiu ............... G06F 16/20 |
| 2008/0005141 | A1 | 1/2008 | Zheng et al. |
| 2008/0263109 | A1 | 10/2008 | Patterson |
| 2008/0294696 | A1* | 11/2008 | Frandzel ............. G06F 3/0608 |
| 2009/0013140 | A1* | 1/2009 | Bondurant ............ G06F 3/067 |
| | | | 711/162 |
| 2009/0300321 | A1 | 12/2009 | Balachandran et al. |
| 2010/0017850 | A1 | 1/2010 | More et al. |
| 2010/0246709 | A1 | 9/2010 | Lillibridge et al. |
| 2010/0318759 | A1 | 12/2010 | Hamilton et al. |
| 2011/0016095 | A1 | 1/2011 | Anglin et al. |
| 2011/0225385 | A1 | 9/2011 | Tofano |
| 2011/0231362 | A1 | 9/2011 | Attarde et al. |
| 2013/0018853 | A1* | 1/2013 | Jayaraman ........... G06F 3/0608 |
| | | | 707/692 |
| 2013/0054544 | A1 | 2/2013 | Li et al. |
| 2013/0138620 | A1 | 5/2013 | Yakushev et al. |
| 2015/0234854 | A1 | 8/2015 | Yakushev et al. |
| 2015/0234855 | A1 | 8/2015 | Yakushev et al. |
| 2016/0042008 | A1* | 2/2016 | Tripathy ............... G06F 3/0641 |
| | | | 707/692 |
| 2016/0350301 | A1* | 12/2016 | Tripathy ............... G06F 3/0608 |

OTHER PUBLICATIONS

Mandagere, Nagapramod, et al. "Demystifying data deduplication." Proceedings of the ACM/IFIP/USENIX Middleware'08 Conference Companion. 2008.*

Wang, G. et al., "Research on a Clustering Data De-Duplication Mechanism based on Bloom Filter", 2010 International Conference on Multimedia Technology (ICMT), 5 pp. IEEE, 2010.

Zhang, X. et al., "Exploiting Data Deduplication to Accelerate Live Virtual Machine Migration", Proceeding of IEEE International Conference on Cluster Computing (CLUSTER), pp. 88-96, 2010.

Meister, D. et al., dedupv1: Improved Deduplication Throughput Using Solid State Drives (SSD), IEEE 26th Sumposium on Mass Storage Systems and Tech (MSST), 6pp. 2010.

Wei, J. et al., "MAD2: A Scalable High-Throughput Exact Deduplication Approach for Network Backup Services", IEEE 26th Sumposium on Mass Storage Systems and Tech (MSST), 14pp. 2010.

International Search Report and Written Opinion, dated Mar. 28, 2013, for International Application No. PCTIB2012/056439, filed Nov. 15, 2012, pp. 1-8.

Examination Report Under Section 18(3), dated Jul. 1, 2014, for Application No. GB1410078.8, Total 3 pages.

Bhagwat, D. et al., "Extreme Binning: Scalable, Parallel Deduplication for Chunk-Based File Backup", Modeling, Analysis & Simulation of Computer and Telecommunication Systems, 2009, MASCOTS '09, IEEE International Symposium on. IEEE, 2009, pp. 9.

Yang, T. et al. "3DNBS: a Data Deduplication Disk-Based Network Backup System", Networking Architecture and Storage, 2009. NAS 2009, IEEE International Conference on., IEEE, 2009, pp. 8.

US Patent Application, dated Nov. 28, 2011, for U.S. Appl. No. 13/305,218 (37.328).

Office Action dated Dec. 6, 2012, pp. 13, to U.S. Appl. No. 13/305,218, (37.328).

Response dated Mar. 5, 2013, pp. 20, to Office Action dated Dec. 6, 2012, pp. 13, to U.S. Appl. No. 13/305,218, (37.328).

Final Office Action dated Apr. 25, 2013, pp. 13, to U.S. Appl. No. 13/305,218, (37.328).

RCE/Response filed Aug. 26, 2013, pp. 12, to Final Office Action dated Apr. 25, 2013, pp. 13, to U.S. Appl. No. 13/305,218, (37.328).

Office Action dated Aug. 19, 2014, pp. 20, to U.S. Appl. No. 13/305,218, (37.328).

Response dated Nov. 19, 2014, pp. 12, to Office Action dated Aug. 19, 2013, pp. 20, to U.S. Appl. No. 13/305,218 (37.328).

Notice of Allowance dated Jan. 30, 2015, pp. 15, for U.S. Appl. No. 13/305,218, (37.328).

List of Patents or Patent Applications Treated as Related, Total 2 pp., dated Sep. 3, 2019.

US Patent Application, dated Apr. 28, 2015, for U.S. Appl. No. 14/698,708, (37.328C1).

Office Action dated Feb. 9, 2018, pp. 25, for U.S. Appl. No. 14/698,708, (37.328C1).

Response dated May 9, 2018, pp. 18, to Office Action dated Feb. 9, 2018, pp. 25, for U.S. Appl. No. 14/698,708, (37.328C1).

Final Office Action dated Jul. 25, 2018, pp. 17, for U.S. Appl. No. 14/698,708, (37.328C1).

Response dated Oct. 25, 2018, pp. 14, to Final Office Action dated Jul. 25, 2018, pp. 17, for U.S. Appl. No. 14/698,708, (37.328C1).

Office Action dated Feb. 20, 2019, pp. 17, for U.S. Appl. No. 14/698,708, (37.328C1).

Response dated May 15, 2019, pp. 8, to Office Action dated Feb. 20, 2019, pp. 17, for U.S. Appl. No. 14/698,708, (37.328C1).

Notice of Allowance dated Jul. 25, 2019, pp. 16, for U.S. Appl. No. 14/698,708, (37.328C1).

US Patent Application, dated Apr. 28, 2015, for U.S. Appl. No. 14/698,720, (37.328C2).

Office Action dated Mar. 8, 2018, pp. 28, for U.S. Appl. No. 14/698,720, (37.328C2).

Response dated Jun. 8, 2018, pp. 17, to Office Action dated Mar. 8, 2018, pp. 28, for U.S. Appl. No. 14/698,720, (37.328C2).

Final Office Action dated Aug. 7, 2018, pp. 18, for U.S. Appl. No. 14/698,720, (37.328C2).

Response dated Nov. 6, 2018, pp. 11, to Final Office Action dated Aug. 7, 2018, pp. 18, for U.S. Appl. No. 14/698,720, (37.328C2).

Office Action dated Mar. 6, 2019, pp. 21, for U.S. Appl. No. 14/698,720, (37.328C2).

Response dated Jun. 5, 2019, pp. 13, to Office Action dated Mar. 6, 2019, pp. 21, for U.S. Appl. No. 14/698,720, (37.328C2).

Information Materials for IDS Dated Dec. 18, 2015, pp. 2.

Thwel, Tin Thein, and Ni Lar Thein. "An efficient indexing mechanism for data deduplication." 2009 International Conference on the Current Trends in Information Technology (CTIT). IEEE, 2009, pp. 5.

Bo, Cai, Zhang Feng Li, and Wang Can. "Research on chunking algorithms of data de-duplication." Proceedings of the 2012 International Conference on Communication, Electronics and Automation Engineering. Springer, Berlin, Heidelberg, 2013, pp. 2.

* cited by examiner

DETERMINING CHUNK BOUNDARIES FOR DEDUPLICATION OF STORAGE OBJECTS

CROSS-REFERENCE TO RELATED APPLICATION

This application is a continuation of U.S. patent application Ser. No. 13/305,218 filed Nov. 28, 2011, which patent application is incorporated herein by reference in its entirety.

TECHNICAL FIELD

The present invention generally relates to data storage and retrieval operations within a data storage system. The present invention more specifically relates to identifying chunk boundaries for optimization of fingerprint-based deduplication.

BACKGROUND

Data deduplication eliminates redundant data to improve storage utilization and reduce the amount of data sent over a network. Deduplication reduces the required storage capacity and network bandwidth because only one copy of a unique data unit is stored and/or sent. Disk based storage systems, such as a storage management server and Volume Tape Library (VTL), may implement deduplication technology to detect redundant data and reduce duplication by avoiding redundant transfer and/or storage of such data.

SUMMARY OF THE INVENTION

Described are embodiments of an invention for identifying chunk boundaries for optimization of fingerprint-based deduplication in a computing environment. Storage objects that are backed up in a computing environment are often compound storage objects which include many individual storage objects. The computing device of the computing environment breaks the storage objects into chunks of data by determining a hash value on a range of data. The computing device creates an artificial chunk boundary when the end of data of the storage object is reached. When an artificial chunk boundary is created for the end of data of a storage object, the computing device stores a pseudo fingerprint for the artificial chunk boundary. If a hash value matches a fingerprint or a pseudo fingerprint, then the computing device determines that the range of data corresponds to a chunk and the computing system defines the chunk boundaries. The pseudo fingerprint of the artificial chunk boundary allows for recognition of an artificial chunk boundary within a compound file. Thus, the computing environment eliminates redundant data during deduplication more efficiently based on the stored pseudo fingerprints on a pseudo fingerprint list.

For example, an embodiment of a computer implemented method for deduplicating a storage object includes determining a chunk identifying hash value for a window of data of the storage object and determining if the chunk identifying hash value matches a fingerprint or a stored pseudo fingerprint. Further, the method determines if the window of data is the end of data of the storage object. The method defines a chunk boundary of a chunk of the storage object that corresponds to the window of data and stores the chunk boundary of the chunk if it is determined that the window of data is the end of data of the storage object.

The method also determines a chunk uniqueness hash on the chunk of the storage object and stores the chunk uniqueness hash information in a deduplication index for the chunk of storage object. The method determines if the chunk identifying hash value matches the known fingerprint by determining if the chunk identifying hash value meets a predetermined mathematical property.

In one embodiment, the pseudo fingerprint of the chunk of the storage object is stored as a pseudo fingerprint on a pseudo fingerprint list. Further, in one embodiment, the method of determining if the chunk identifying hash value matches a pseudo fingerprint includes determining if the chunk identifying hash value is stored on the pseudo fingerprint list.

The method may determine the chunk identifying hash value of the window of data of the storage object by calculating a rolling hash value of the window of data of the storage object. In one embodiment, the rolling hash may be a Karp-Rabin rolling hash.

The method also includes defining the chunk of a storage object corresponding to a window of data and storing a chunk boundary of the chunk when it is determined that the chunk identifying hash value matches a fingerprint. Finally, the method includes determining a chunk identifying hash value of another window of data when it is determined that the window of data is not the end of data of the storage object. The method determines if the determined chunk identifying hash value of the another chunk matches a fingerprint or a stored pseudo fingerprint.

In an embodiment of a computer program product which includes a computer readable storage medium having computer readable program code embodied therein that executes to perform operations, the operations including determining a chunk identifying hash value for a window of data of the storage object and determining if the chunk identifying hash value matches a fingerprint or a stored pseudo fingerprint. The operations further include determining if the window of data is the end of data of the storage object if it is determined that the chunk identifying hash value of the window of data of the storage object does not match either the fingerprint or the stored pseudo fingerprint. The operations further define a chunk boundary of a chunk of the storage object that corresponds to the window of data and stores the chunk boundary of the chunk if it is determined that the window of data is the end of data of the storage object.

In another embodiment of a computing device of a computing environment, the device includes memory coupled to a processor. The memory includes instructions implemented by the processor to determine a chunk identifying hash value for a window of data of the storage object and determine if the chunk identifying hash value matches a fingerprint or a stored pseudo fingerprint. The processor determines if the window of data is the end of data of the storage object if it is determined that the chunk identifying hash value of the window of data of the storage object does not match either the fingerprint or the stored pseudo fingerprint. The processor further defines a chunk boundary of a chunk of the storage object that corresponds to the window of data and stores the chunk boundary of the chunk if it is determined that the window of data is the end of data of the storage object.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF THE PREFERRED EMBODIMENT

Figure 1:
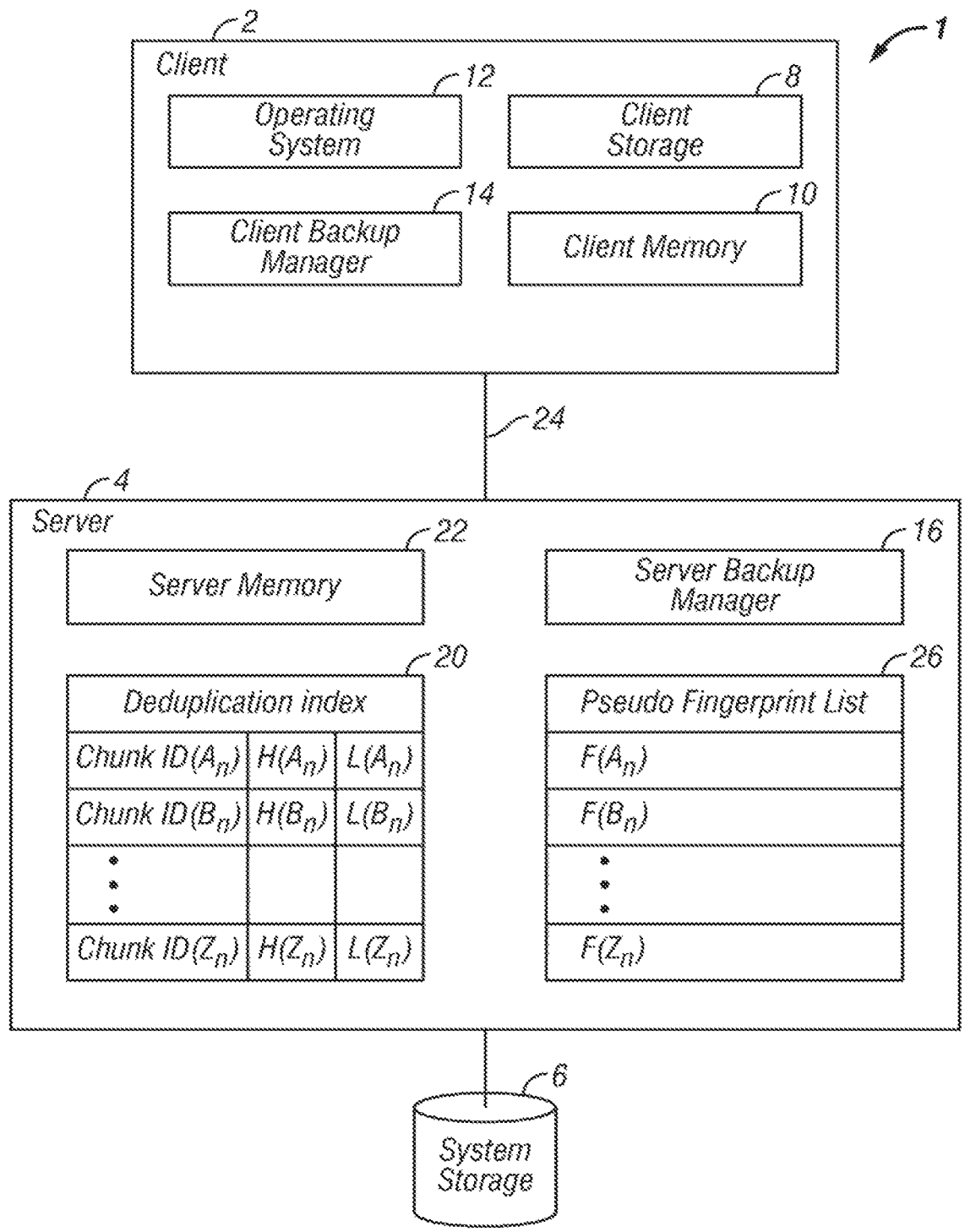
FIG. 1 illustrates computing environment that performs data operations in accordance with an embodiment of the invention.

Described are embodiments of an invention for identifying chunk boundaries for optimization of fingerprint-based deduplication in a computing environment. Storage objects that are backed up in a computing environment are often compound storage objects which include many individual storage objects. The computing device of the computing environment breaks the storage objects into chunks of data by determining a hash value on a range of data. The computing device creates an artificial chunk boundary when the end of data of the storage object is reached. When an artificial chunk boundary is created for the end of data of a storage object, the computing device stores a pseudo fingerprint for the artificial chunk boundary. If a hash value matches a fingerprint or a pseudo fingerprint, then the computing device determines that the range of data corresponds to a chunk and the computing system defines the chunk boundaries. The pseudo fingerprint of the artificial chunk boundary allows for recognition of an artificial chunk boundary within a compound file. Thus, the computing environment eliminates redundant data during deduplication more efficiently based on the stored pseudo fingerprints on a pseudo fingerprint list.

It will be obvious, however, to one skilled in the art, that embodiments of the present invention may be practiced without some or all of these specific details. In other instances, well known process operations have not been described in detail to prevent obscuring the embodiments of the present invention described herein.

Data deduplication is a data compression technique for eliminating redundant data to improve storage utilization and reduce the amount of data sent over a network. Deduplication reduces the required storage capacity and network bandwidth because only one copy of a unique data unit, also known as a chunk, is stored and/or sent. A computing environment performing deduplication operates by dividing a storage object into a series of chunks, where each chunk is defined by the chunk boundaries. A boundary, or chunk boundary, refers to a position within the data that defines an endpoint of a chunk. Two successive boundaries define the two endpoints of a corresponding chunk. In one embodiment, a storage object may be divided into chunks using a hash function, such as a rolling hash. This initial hash value identifies the boundaries of the chunk without determining the uniqueness of the chunk. The initial hash may herein be referred to as the chunk identifying hash, and the chunk identifying hash value of a chunk may herein be referred to as the fingerprint. In one embodiment, the chunk identifying hash may be rolling hash such as a Karp-Rabin hash (also referred to as Karp-Rabin fingerprinting), however, any chunking algorithm could be used.

The computing environment determines whether any of the chunks are already stored. Redundant chunks may be detected using a secondary hash function, such as MD5 (Message-Digest Algorithm 5) or SHA-1 (Secure Hash Algorithm 1), on each chunk to produce a secondary hash value (also known as a digest) for the chunks and then compare those secondary hash values against hash values of chunks already stored on the system. The secondary hash determines the uniqueness of the chunk and may herein be referred to as the chunk uniqueness hash in order to differentiate from the chunk identifying hash. The hash values for stored chunks may be maintained in an index such as a deduplication index. A chunk may be uniquely identified by a hash value and a chunk size. The hash value of a chunk being considered is looked-up in the deduplication index. If an entry is found for that hash value and size, then a redundant chunk is identified, and that chunk in the set or object can be replaced with a pointer to the matching chunk maintained in storage. Thus, the computing environment only stores the non-redundant chunks.

The chunk identifying hash to determine the boundaries of the chunk is performed on a sliding window of data, e.g., 48 bytes, in a buffer array. The computing environment determines if the hash value determined on the window of data matches a fingerprint. In one embodiment, the computing environment determines the hash value matches a fingerprint by determining if the hash value meets a predetermined mathematical property used for determining chunk boundaries. If the chunk identifying hash value determined does not match the predetermined mathematical property then the oldest byte in the array is replaced with the newest byte and the hash value is determined again. If the hash value determined does match the predetermined mathematical property then the chunk boundary is defined for the chunk. However, when the computing environment reaches the end of data of a storage object and the hash value determined does not match the predetermined mathematical property the computing environment creates an artificial chunk boundary. The term "artificial chunk boundary" will herein be used to describe a chunk boundary created in a non-ordinary manner, such as when the fingerprint does not match the predetermined mathematical property.

Commonly, a client will have a compound file or storage object with a plurality of individual files. For example, consider an email from user A which includes user's A text, user A's presentation attached as a pdf, and a forwarded text note from user B regarding the presentation. While the user A's text may be newly generated data, user A's presentation and the text note from user B regarding the presentation may have been previously stored at the client and backed up at a server. Each of the individual storage objects has an end of data. If deduplicated separately, the computing environment would create an artificial chunk boundary at the end of data of the user A's text, another artificial chunk boundary at the end of data of the presentation, and another artificial chunk boundary at the end of data of the note from the user B. In contrast, if the entire email (e.g. the user A's text, presentation and the user B's note) were deduplicated as a single storage object, the computing system would create chunks when the chunk identifying hash value matches a fingerprint, not at the locations where the artificial chunk boundaries were created in the individual files. Since the chunk boundaries created when deduplicating the compound storage object do not match the chunk boundaries created when deduplicating the individual storage objects, all redundant chunks of data cannot be identified by the chunk uniqueness hash function. Thus, the elimination of redundant data is not fully optimized when the previous deduplication methods are employed.

In accordance with one embodiment, FIG. 1 is a diagram illustrating a computing environment 1 that performs data operations, such as read operations, write operations, and backup operations such as deduplication. The computing environment 1 includes computing systems such as server 4 and at least one client 2. Deduplication can be performed at the client 2, server 4 or on a deduplication appliance (not shown) connected to the server 2. The server 4 and the client(s) 2 communicate with each other via connection 24. While there is only a single client shown in FIG. 1, one of ordinary skill in the art would understand that more than one client 2 may be connected to server 4.

In one embodiment, the client 2 and server 4 may comprise separate computer systems and the connection 24 may comprise a network, such as a local area network (LAN), storage area network (SAN), wide area network (WAN), etc. In further embodiments, the client 2 and server 4 components may be implemented on a single computer system platform, and the connection 24 may comprise communication over a bus or via memory. In one embodiment, for example, server 4, could be a file server, IBM Tivoli® Storage Manager (TSM) server, a web application server, or a Network-attached storage (NAS). Server 2 may also be part of a Storage Area Network (SAN) network. Server 4 may include processor (not shown) capable of executing program code.

Each client 2 may include local client storage 8. In practice, client storage 8 may be a magnetic disk drive, or a solid state storage device, such as a flash memory. Client 2 maintains storage objects and the information regarding the storage objects. The term "storage object" is used herein to broadly describe data, whether it be a file or an object. Storage objects are herein represented as storage objects A, B, . . . Z and may be generally represented by storage object, Z, for simplicity. Client 2 includes an operating system 12 to generate and maintain storage objects at the client 2. The storage objects may be stored locally in client storage 8. The client 2 maintains storage object information such as metadata in client memory 10. In an embodiment in which the deduplication is performed at the client 2 (i.e. source side deduplication) the information may include an ordered list of chunks of the storage objects. The chunks of storage objects are herein represented as chunks $A_n$, $B_n$, . . . $Z_n$, where n≥1, and may be more generally represented by chunk, $Z_n$, for simplicity. Still further, in an embodiment in which the deduplication is performed at the client 2, the client backup manager 14 transfers non-redundant chunks of the storage object over connection 24 to backup to a server backup manager 16 in the server 4. In an embodiment in which the deduplication is performed at the server 4 (i.e. target side deduplication), the client backup manager 14 transfers storage objects over connection 24 to backup to a server backup manager 16 in the server 4.

The server backup manager 16 maintains a deduplication index 20 to store only one copy of a chunk in the storage 6, although one chunk may be included in multiple storage objects. The server backup manager 16 also maintains a pseudo fingerprint list 26 of a chunk identifying hash value of a chunk of a storage object as an identifier for that chunk for use in deduplication.

The server 4 may further include server memory 22. Server memory 22 may maintain chunk information indicating a chunk location of each chunk of storage objects being backed up at system storage 6. The system storage 6 may comprise storage media implemented in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, flash disk, storage-class memory (SCM)), electronic memory, magnetic tape media, tape cartridges, etc.

Connection 24 may include any number of switches, routers, and other specialized network computing devices providing data transfer services between computing systems of the computing environment 1. Accordingly, the server 4 can bi-directionally communicate data to and from the client(s) 2. Specifically, a client 2 may request the services of the server 4, by exchanging data packets over connection 24. The client 2 may issue data packets using file-based access protocols or block-based access protocols. Such protocols are common and include the Common Internet File System (CIFS) protocol, Network File System (NFS) protocol, Transmission Control Protocol/Internet Protocol (TCP/IP), Small Computer Systems Interface (SCSI) protocol encapsulated over TCP (iSCSI) and SCSI encapsulated over Fibre Channel (FCP). It should be appreciated that any computing system may communicate with any other computing system of the computing environment 1 in this manner.

The client 14 and server 16 backup managers may comprise software programs in a memory executed by a processor. In an alternative embodiment, some portion or all of the programs may be implemented in a hardware component, such as a dedicated integrated circuit, e.g., Application Specific Integrated Circuit (ASIC), expansion card, etc.

Deduplication can be performed at the client, server or on a deduplication appliance connected to the server. Although the client 14 and server 16 backup managers are shown as separate components, in alternative implementations the functions performed by the client 14 and server 16 backup managers may be implemented in a single program component in a single computer system or in more than two program components in more than two computer devices. Still further, while the following embodiments describes deduplication being performed at the target (e.g. server 4) this invention could be also implemented in an embodiment in which the deduplication was performed at the source (e.g. client 2) or at an appliance as understood by one of ordinary skill in the art.

It should be appreciated that the computing system(s) can be any device capable of processing data, such as, a server, mainframe, personal computer, laptop, or mobile device, which includes smartphones and the like. The computing systems can include additional components such as at least one processor, memory, a network adapter, and antenna that are managed by an operating system.

Further, the computing device may include a user interface, such as a keyboard, touchscreen, or pointing device that enables user input. Finally, the computing device may include a user viewable screen displaying a graphical user interface (GUI) or text-based interface, such as a Command Line Interface (CLI).

Many general or special purpose operating systems exist that manage the components of the computing system, such as Lunix, or other Unix-type operating systems and Microsoft Windows-style operating systems. The operating systems can organize data using "file systems," which are data repositories for files.

As discussed above, the client 2 maintains storage object information, such as metadata, in client memory 10. Similarly, the server 4 maintains storage object information, such as metadata, in the server memory 22. The storage object information includes an identifier of the storage object and one or more chunks of data assigned to the storage object. In one embodiment, the chunks may be of variable length, i.e., have the same or different lengths. The storage object information may maintain an ordered list of the chunks indicating the order in which the chunks appear in the storage object. For each chunk the information maintains a chunk uniqueness hash value of the chunk and a length of the chunk. In this way, the information provides metadata on the chunks included in the set, such as a hash value and length, but not the actual data. The chunk uniqueness hash value of the chunk may be determined by processing the chunk to generate a unique value for the chunk. For instance, in one embodiment, the hash value may comprise a cryptographic hash, such as MD5 (Message-Digest Algorithm 5) or SHA-1 (Secure Hash Algorithm 1), which calculates cryptographic hashes of each chunk in the storage object.

Figure 2:
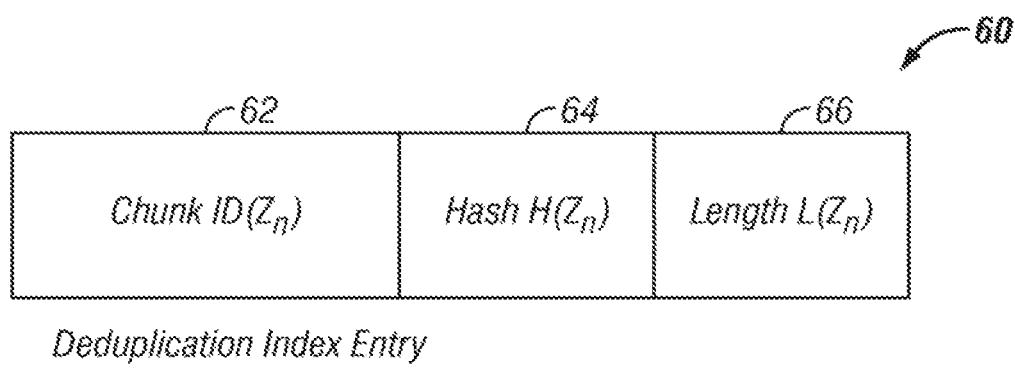
FIG. 2 illustrates a deduplication index entry in accordance with an embodiment of the invention.

FIG. 2 illustrates an embodiment of a deduplication index entry 60 maintained by the server backup manager 16 for each chunk, $Z_n$, stored in system storage 6. The index entry 60 includes a chunk identifier (Chunk ID($Z_n$)) 62 of the chunk in storage 6, a hash value 64, $H(Z_n)$, computed from the chunk, $Z_n$, represented by the chunk identifier and a length 66, $L(Z_n)$, of the chunk. When the server backup manager 16 determines whether to store a full copy of a chunk, $Z_n$, at system storage 6, the server backup manager 16 may determine whether one entry 60 in the deduplication index 20 has a chunk uniqueness hash value 64, $H(Z_n)$, and length 66, $L(Z_n)$, matching the hash value $H(Z_n)$ of the current chunk $Z_n$.

Figure 3:
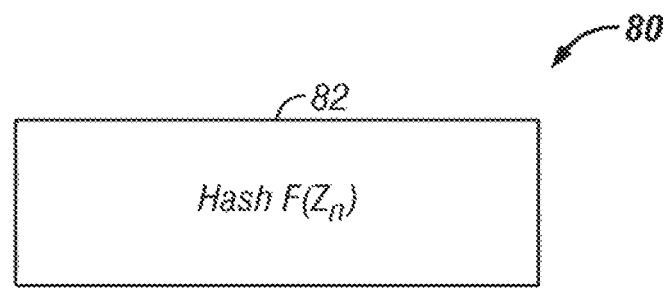
FIG. 3 illustrates a pseudo fingerprint list entry in accordance with an embodiment of the invention.

FIG. 3 illustrates an embodiment of a pseudo fingerprint list entry 80 maintained by the server backup manager 16 for each chunk, $Z_n$, created having an artificial chunk boundary. The list entry 80 includes an chunk identifying hash value 82, $F(Z_n)$, of the chunk, $Z_n$, in system storage 6. When the server backup manager 16 determines the chunk boundary of a chunk, $Z_n$, for deduplication, the server backup manager 16 determines whether one entry 80 in the pseudo fingerprint list matches a chunk identifying hash value $F(Z_n)$ of the window of data of storage object Z.

Figure 4:
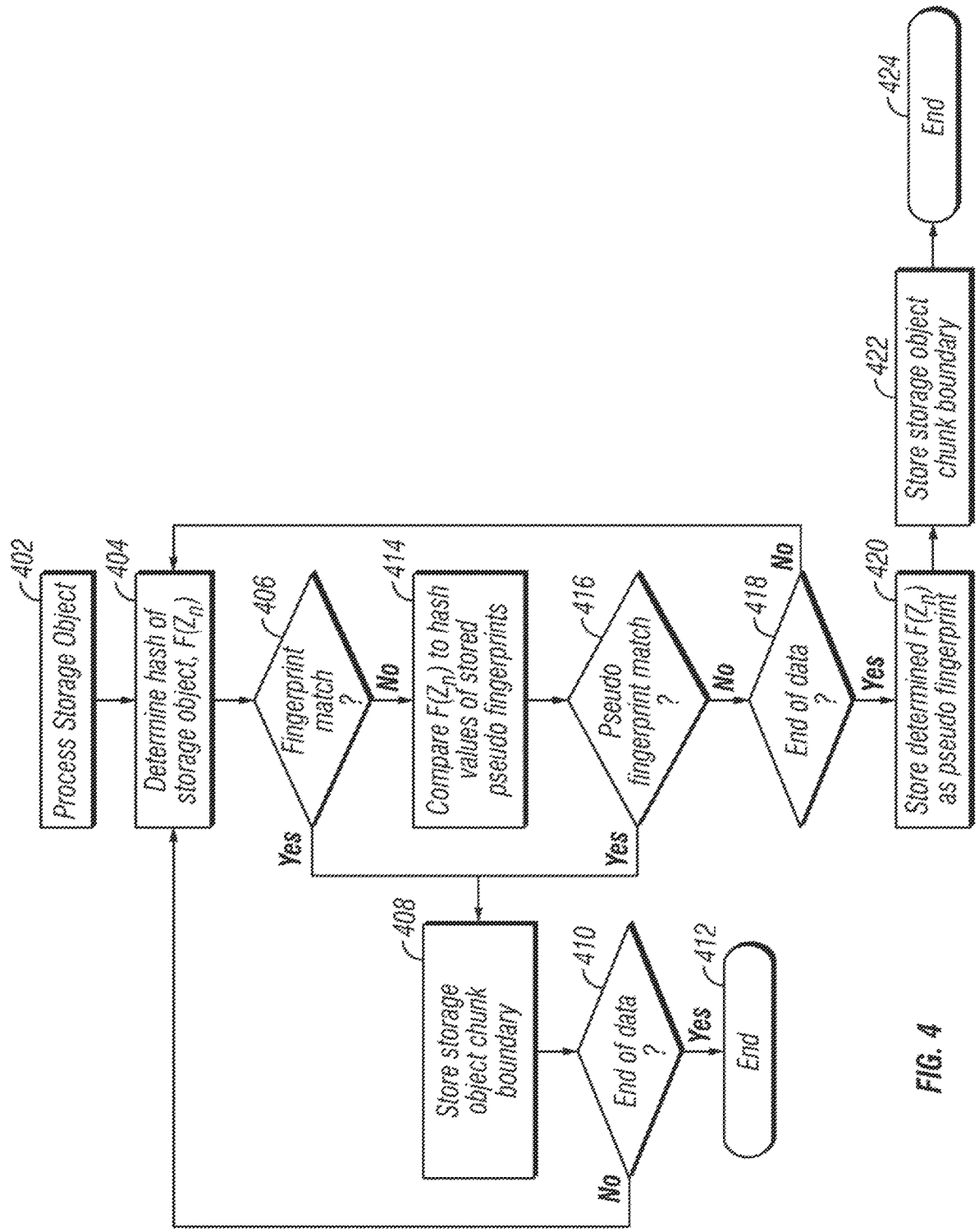
FIG. 4 is flow chart illustrating defining chunk boundaries of a storage object in accordance with an embodiment of the invention.

An embodiment of the present invention will be described with respect to FIG. 4. FIG. 4 is a flow chart illustrating the steps of defining chunk boundaries of a storage object in accordance with an embodiment of the invention.

Upon a client 2 generating a new or changed storage object, the client 2 sends the storage object, Z, to the server backup manager for backing up the storage object on system storage 6. In step 402 the server backup manager 16 begins processing the storage object, Z, for backing up at system storage 6. In step 404 the server backup manager 16 determines a chunk identifying hash value, $F(Z_n)$, of a window of data of the storage object, Z. In one embodiment, the server backup manager 16 determines the chunk identifying hash value, $F(Z_n)$, by calculation. However, one of ordinary skill in the art would understand that the server backup manager 16 may determine the chunk identifying hash value by other methods, such as obtaining it from another computing device of the computing environment 1. The chunk identifying hash value of the window of data, $F(Z_n)$, acts as fingerprint to determine the boundaries of a chunk $Z_n$. In one embodiment the chunk identifying hash is a rolling hash such as a Karp-Rabin hash. However, any chunking algorithm could be used to determine the boundaries of the chunks.

In step 406 the server backup manager 16 determines if the chunk identifying hash value, $F(Z_n)$, matches a fingerprint. In one embodiment, the server backup manager 16 determines the chunk identifying hash value, $F(Z_n)$, matches a fingerprint by determining if the chunk identifying hash value, $F(Z_n)$, meets a predetermined mathematical property. In one embodiment, the predetermined mathematical property may be that the chunk identifying hash value, $F(Z_n)$, is divisible by 1000. Alternatively, the predetermined mathematical property may be that the chunk identifying hash value, $F(Z_n)$, is an odd number, or an even number, or a prime number, etc. As one of ordinary skill in the art would understand any predetermined mathematical property may be used to suit the needs of the computing environment 1. The mathematical property may be predetermined by the user, an Information Technology (IT) administrator, or other administrator, or alternatively, it may be predetermined by the manufacturer.

If it is determined in step 406 that the chunk identifying hash value, $F(Z_n)$, matches a fingerprint then the window of data corresponds to a chunk boundary and the process follows to step 408. In one embodiment, the last byte of the window of data corresponds to the last byte of the chunk, $Z_n$, and the chunk boundary is placed at the end of the last byte of the window of data. However, it should be understood that any correspondence may be used to define the boundary of the chunk $Z_n$. Further, in one embodiment, while the endpoint chunk boundary of the chunk is defined at the end of the last byte of the window of data, the starting point boundary is the endpoint chunk boundary of the previous chunk. In step 408 the server backup manager 16 stores the storage object chunk boundary. In one embodiment, the chunk boundary is stored in server memory 22. In step 410 the server backup manager 16 determines if window of data for which the chunk identifying hash value, $F(Z_n)$, was determined was the end of data of the storage object. If it is determined that that the window of data was the end of data, then the process ends at step 412. However, if it is determined that the window of data is not the end of data in step 410, then the process returns to step 404. In step 404 the oldest byte in the window of data is replaced with a new byte and the chunk identifying hash value $F(Z_n)$ is determined again.

Returning to step 406, if it is determined that the chunk identifying hash value $F(Z_n)$ does not match a fingerprint the process flows to step 414. In step 414, the server backup manager 16 compares the chunk identifying hash value, $F(Z_n)$ to the hash values stored in the pseudo fingerprint list 26. In step 416 the server backup manager 16 determines if the chunk identifying hash value $F(Z_n)$ determined in step 404 matches any of the hash values or pseudo fingerprints stored in the pseudo fingerprint list 26. If it is determined in step 416 that the chunk identifying hash value $F(Z_n)$ determined in step 404 matches a pseudo fingerprint stored on the pseudo fingerprint list 26, then the process flows to step 408, in which the server backup manager 16 stores the storage object chunk boundary. As discussed above, in one embodiment, the chunk boundary corresponds to the end of the window of data. The storage object chunk boundary is stored in server memory 22. However, if it is determined that the chunk identifying hash value $F(Z_n)$ determined in step 404 does not match a pseudo fingerprint stored on the pseudo fingerprint list 26, then the process flows to step 418.

In step 418 the server backup manager 16 determines if window of data for which the chunk identifying hash value, $F(Z_n)$, was determined was the end of data of the storage object. If it is determined that the window of data is not the end of data in step 410, then the process returns to step 404. In step 404 the oldest byte in the window of data is replaced with a new byte and the chunk identifying hash value, $F(Z_n)$, is determined again. However, if it is determined that that the window of data was the end of data, then the process flows to step 420 where the determined chunk identifying hash value $F(Z_n)$ is stored as a pseudo fingerprint in the pseudo fingerprint list 26. In step 422 the server backup manager 16 stores the storage object chunk boundary corresponding with the window of data for which the chunk identifying hash $F(Z_n)$ was determined. The process ends at step 424.

One of ordinary skill in the art would understand that once the chunks of the storage object are defined normal deduplication processing may occur. For example, the chunk uniqueness hash may be determined to determine if the chunk, defined by the chunk boundaries as described above, is a redundant chunk.

Accordingly, the process flow described in FIG. 4 enables the computing environment to build a list of pseudo fingerprints to ensure that chunks created with artificial chunk boundaries are subsequently recognized and effectively deduplicated.

Figure 5:
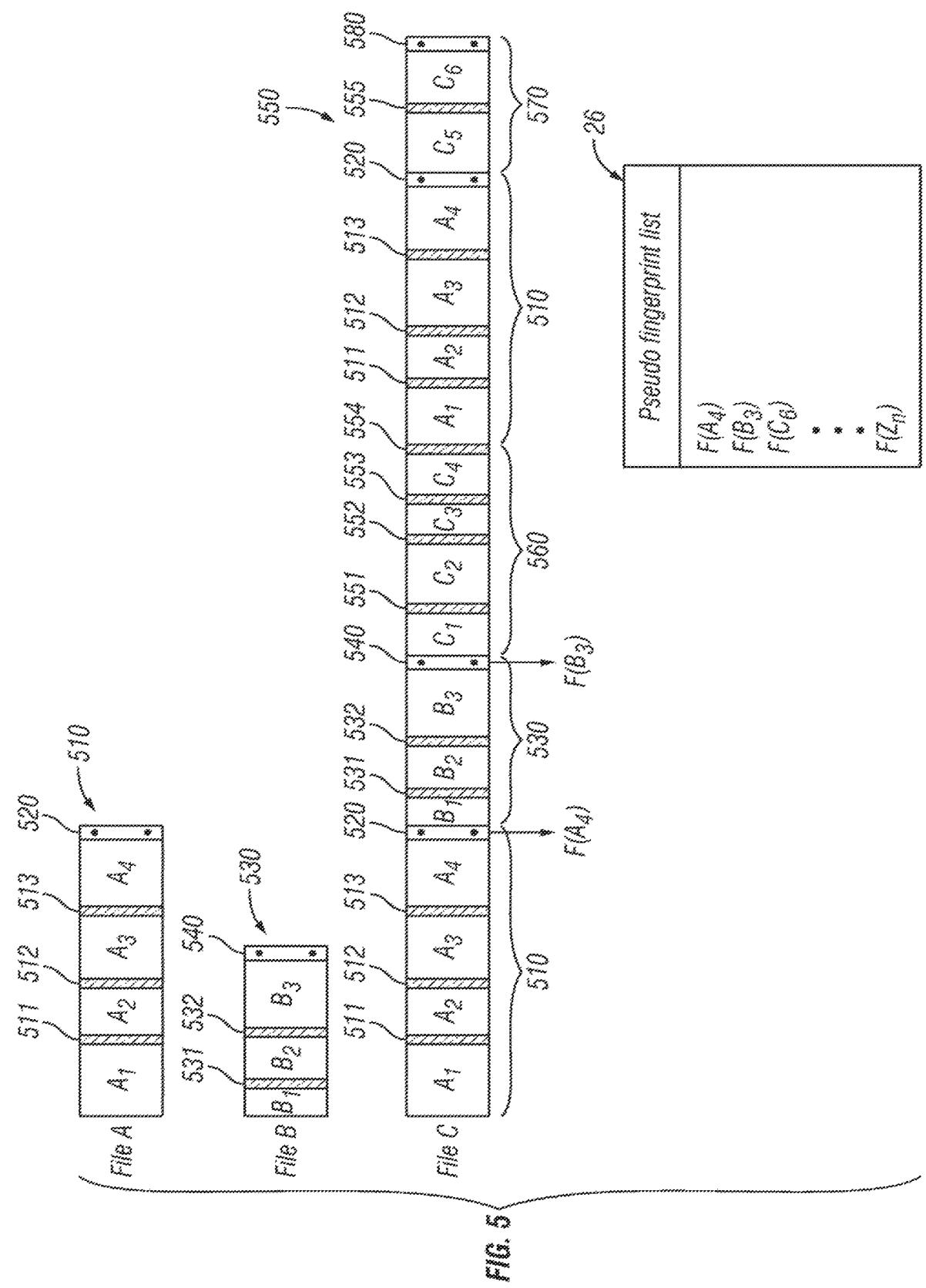
FIG. 5 is illustrates defining boundaries of chunks of a storage objects in accordance with an embodiment of the invention.

FIG. 5 illustrates and embodiment of defining the chunk boundaries of three storage objects in accordance with an embodiment of the invention. In the embodiment shown by FIG. 5, the storage objects are files. File A, 510, and File B, 530, are individual files without any additional embedded files. File C, 550, is a compound file, which includes File A, 510, File B, 530, newly created data, followed by File A, 510, and additional newly created data. In the described embodiment, the server backup manager 16 determines the chunk identifying hash value, $F(Z_n)$, by calculation. However, one of ordinary skill in the art would understand that the server backup manager 16 may determine the chunk identifying hash value by other methods as described above. For simplicity of discussion, each window of data will correspond to a chunk in the following description. However, it should be understood by one of ordinary skill in the art, that there are instances in which the fingerprint and the pseudo fingerprint would not match the calculated chunk identifying hash value $F(Z_n)$. In these instances, if the window of data was not the end of data then the oldest byte in the array is replaced with the newest byte and the chunk identifying hash value is calculated on a second window of data.

In accordance with this embodiment, File A is created by the client 2 and sent to the server backup manager 16 for managing the backup of file A in system storage 6. The server backup manager processes file A to determine chunk boundaries (step 402). Server backup manager 16 calculates a chunk identifying hash $F(A_1)$ on a first window of data of File A (step 404). The server backup manager 16 determines that chunk identifying hash value $F(A_1)$ matches a fingerprint (step 406) and creates a chunk boundary 511 and stores the chunk boundary 511 (step 408). The server backup manager 16 determines that the file has more data to process and the oldest byte in the window of data is replaced with a new byte and the chunk identifying hash value $F(A_2)$ is calculated on a second window of data. The process repeats itself as chunk boundaries 512 and 513 are created and stored. Finally, as the window of data for the hash calculation approaches the end of data of file A the calculated chunk identifying hash $F(A_4)$ (step 404) does not match a fingerprint (step 406) the server backup manager 16 compares the chunk identifying hash value $F(A_4)$ to stored pseudo fingerprints on pseudo fingerprint list 26. When the server backup manager 16 determines that the chunk identifying hash value $F(A_4)$ does not match a pseudo fingerprint, and that window of data is the end of data of file A, then the calculated chunk identifying hash value $F(A_4)$ is stored as a pseudo fingerprint in the pseudo fingerprint list 26 (step 420) and an artificial chunk boundary 520 is stored for file A (step 422).

The chunking process of deduplication file B is similar to that of chunking file A. File B is created by the client 2 and sent to the server backup manager 16 for managing the backup of file B in system storage 6. The server backup manager processes file B to determine chunk boundaries (step 402). Server backup manager 16 calculates a chunk identifying hash $F(B_1)$ on a first window of data of File B (step 404). The server backup manager 16 determines that chunk identifying hash value $F(B_1)$ matches a fingerprint (step 406) and creates a chunk boundary 531 and stores the chunk boundary 531 (step 408). The server backup manager 16 determines that the file has more data to process (step 410) and the oldest byte in the window of data is replaced with a new byte and the chunk identifying hash value $F(B_2)$ is calculated on a second window of data (step 404). The process repeats itself as chunk boundary 532 is created and stored. Finally, as the window of data for the hash calculation approaches the end of data of file B the calculated chunk identifying hash $F(B_3)$ (step 404) does not match a fingerprint (step 406) the server backup manager 16 compares the chunk identifying hash value $F(B_3)$ to stored pseudo fingerprints on pseudo fingerprint list 26. When the server backup manager 16 determines that the chunk identifying hash value $F(B_3)$ does not match a pseudo fingerprint and that window of data is the end of data of file B then the calculated chunk identifying hash value $F(B_3)$ is stored as a pseudo fingerprint in the pseudo fingerprint list 26 (step 420) and an artificial chunk boundary 540 is stored for file B (step 422).

As described above, File C, 550, is a compound file. As shown in FIG. 5, compound file C includes File A, 510, File B, 530, newly created data 560, followed by File A, 510, and additional newly created data 570. In accordance embodiment and steps discussed above, File A and File B have been deduplicated and the pseudo fingerprints 82 of arbitrary boundaries 520 and 540 have been determined and stored in the pseudo fingerprint list 26. Further, the deduplication index 20 has stored the chunk identity 62, the hash value 64, and the length 66 of the chunk of each of chunk of File A and File B (e.g. A1, A2, A3, A4, B1, B2, B3). Since the pseudo fingerprints 82 of the arbitrary boundaries 520 and 540 have been stored, the arbitrary chunk boundaries that are embedded in the compound File C are also recognized as chunk boundaries during the deduplication of File C. Accordingly, the chunk uniqueness hash value calculated on any arbitrary chunk will match the hash value, $H(Z_n)$, stored in the deduplication index 20 and the redundant chunk will be detected and not stored unnecessarily.

The process of deduplicating File C is described in accordance with the operations illustrated in FIG. 5. File C is created by the client 2 and sent to the server backup manager 16 for managing the backup of file C in system storage 6. The server backup manager begins the processing file C to determine chunk boundaries (step 402). Server backup manager 16 calculates a chunk identifying hash $F(A_1)$ on a first window of data of File C that corresponds to File A (step 404). The server backup manager 16 determines that chunk identifying hash value $F(A_1)$ matches a fingerprint (step 406) and creates a chunk boundary 511 and stores the chunk boundary 511 (step 408). The server backup manager 16 determines that the file has more data to process and the oldest byte in the window of data is replaced with a new byte and the chunk identifying hash value $F(A_2)$ is calculated on the second window of data. The process repeats itself as chunk boundaries 512 and 513 are created and stored. As the window of data for the hash calculation approaches the end of data that corresponds with file A the calculated chunk identifying hash $F(A_4)$ (step 404) does not match a fingerprint (step 406). The server backup manager 16 then compares the chunk identifying hash value $F(A_4)$ to stored pseudo fingerprints on pseudo fingerprint list 26 (step 416). When the server backup manager 16 determines that the chunk identifying hash value $F(A_4)$ matches the pseudo fingerprint $F(A_4)$ on the pseudo fingerprint list the server backup manager 16 stores the chunk boundary 520 corresponding with the window of data (step 408).

The server backup manager determines that File C has more data to process (step 410) and the oldest byte in the window of data is replaced with a new byte and the chunk identifying hash value is calculated again. Server backup manager 16 calculates a chunk identifying hash $F(B_1)$ on a window of data that corresponds to the first part of File B (step 404). The server backup manager 16 determines that chunk identifying hash value $F(B_1)$ matches a fingerprint (step 406) and creates a chunk boundary 531 and stores the chunk boundary 531 (step 408). The server backup manager 16 determines that the file has more data to process and the oldest byte in the window of data is replaced with a new byte and the chunk identifying hash value $F(B_2)$ is calculated on a the new window of data. The process repeats itself as chunk boundary 532 is created and stored. As the window of data for the hash calculation approaches the end of data that corresponds with File B the calculated chunk identifying hash $F(B_3)$ (step 404) does not match a fingerprint (step 406). The server backup manager 16 then compares the chunk identifying hash value $F(B_3)$ to stored pseudo fingerprints on pseudo fingerprint list 26 (step 416). When the server backup manager 16 determines that the chunk identifying hash value $F(B_3)$ matches the pseudo fingerprint $F(B_3)$ on the pseudo fingerprint list 16 the server backup manager 16 stores the chunk boundary 540 corresponding with the window of data (step 408).

Again, the server backup manager 16 determines that File C has more data to process (step 410) and the oldest byte in the window of data is replaced with a new byte and the chunk identifying hash value of the new data window is calculated. Server backup manager 16 calculates a chunk identifying hash $F(C_1)$ on a next window of data of File C (step 404) which corresponds to newly created unique data. The server backup manager 16 determines that chunk identifying hash value $F(C_1)$ matches a fingerprint (step 406) and creates a chunk boundary 551 and stores the chunk boundary 551 (step 408). The server backup manager 16 determines that the file has more data to process and the oldest byte in the window of data is replaced with a new byte and the chunk identifying hash value $F(C_2)$ is calculated on the new window of data. The process repeats itself as chunk boundaries 552, 553, 554 are created and stored.

The server backup manager 16 determines that File C has more data to process (step 410) and the oldest byte in the window of data is replaced with a new byte and the chunk identifying hash value on the new window is calculated. Server backup manager 16 calculates a chunk identifying hash $F(A_1)$ on a window of data that corresponds to the first part of File A (step 404). In the same manner as discussed above, the server backup manager 16 determines that chunk identifying hash value $F(A_1)$ matches a fingerprint (step 406) and creates a chunk boundaries 511, 512, 513 and stores the chunk boundaries (step 408). Similarly, as discussed above, the server backup manager 16 determines that the chunk identifying hash value $F(A_4)$ matches the pseudo fingerprint $F(A_4)$ on the pseudo fingerprint list and stores the chunk boundary (step 408).

Again the server backup manager 16 determines that File C has more data to process (step 410) and the oldest byte in the window of data is replaced with a new byte and the chunk identifying hash value is calculated on the new window of data. The server backup manager 16 calculates a chunk identifying hash $F(C_5)$ on a next window of data of File C (step 404) which corresponds to newly created unique data. The server backup manager 16 determines that chunk identifying hash value $F(C_5)$ matches a fingerprint (step 406) and creates a chunk boundary 555 and stores the chunk boundary 555 (step 408). Finally, as the window of data for the hash calculation approaches the end of data of file C and the calculated chunk identifying hash $F(C_6)$ (step 404) does not match a fingerprint (step 406) the server backup manager 16 compares the chunk identifying hash value $F(C_6)$ to stored pseudo fingerprints on pseudo fingerprint list 26. When the server backup manager 16 determines that the chunk identifying hash value $F(C_6)$ does not match a pseudo fingerprint and that window of data is the end of data of File C, then the calculated chunk identifying hash value $F(C_6)$ is stored as a pseudo fingerprint in the pseudo fingerprint list 26 (step 420) and an artificial chunk boundary 580 is stored for file C (step 422).

Figure 6:
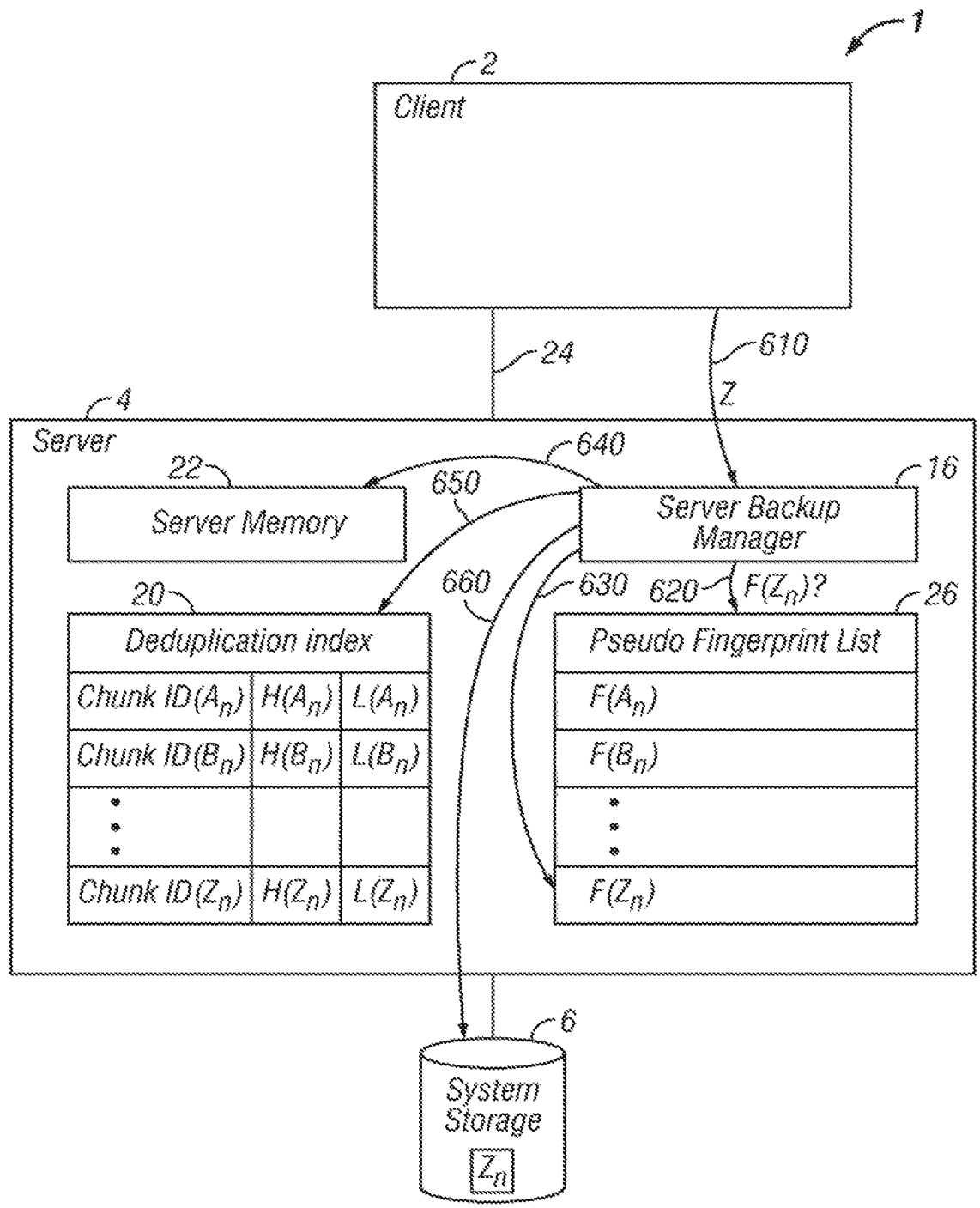
FIG. 6 is a diagram illustrating the performance of the computing environment in accordance with an embodiment of the invention.

FIG. 6 is a diagram illustrating the performance of the computing environment 1 during a deduplication process in accordance with one embodiment of the invention. FIG. 6 will be described with respect to the embodiment in which the client 2 creates a storage object, Z, having and end of data corresponding to a chunk $Z_n$ that has not been backed up in system storage 6. Further, FIG. 6 will be described with respect to an embodiment in which the deduplication is performed at the server 4. However, one of ordinary skill in the art should understand that the description herein would also apply to other embodiments of the invention. For example, in an embodiment in which the deduplication was performed on the client-side, the process described herein would be performed on the client.

Referring to FIG. 6, the computing environment 1 includes at least one client 2 connected through a network 24 to a server 4 for backing up storage objects stored in client storage 8. For example, upon a client 2 generating a new or changed storage object, the client storage 8 stores storage object, Z, on one or magnetic disk(s). The server 4 is connected to storage system 6 which may include one more storage devices as described above. Client 2 sends the storage object Z (610) to the server backup manager 16 for backing up the storage object, Z, on system storage 6.

In an example of an embodiment of the present invention, the computing environment 1 is able to determine a chunk identifying hash value for a window of data of a storage object and determine if the chunk identifying hash value matches a fingerprint or a stored pseudo fingerprint on a pseudo fingerprint list 26. The computing environment 1 defines the chunk boundary of a chunk of the storage object when it is determined that the window of data of the storage object is the end of data of the storage object and the chunk identifying hash value does not match a fingerprint or a stored pseudo fingerprint. The computing environment 1 stores the chunk identifying hash value as a pseudo fingerprint of the chunk of the storage object. Accordingly, the storage environment 1 is able to recognize artificial chunk boundaries and eliminate redundant data more efficiently during deduplication based on a chunk identifying hash value stored as a pseudo fingerprint on a pseudo fingerprint list 26.

The server backup manager 16 determines a chunk identifying hash value, $F(Z_n)$, of a window of data of the storage object Z. The server backup manager 16 determines if the determined chunk identifying hash value, $F(Z_n)$ matches a fingerprint. In this example, the window of data corresponds to and end of data, and therefore, the hash value calculated does not match a fingerprint. The server backup manager 16 determines if the chunk identifying hash value $F(Z_n)$ matches a stored pseudo fingerprint on the pseudo fingerprint list 26 (620). In this example, the chunk, $Z_n$, has not yet been deduplicated and the chunk identifying hash value $F(Z_n)$ has not been stored in the pseudo fingerprint list 26. Accordingly, the server backup manager 16 determines that the chunk identifying hash value $F(Z_n)$ does not match a pseudo fingerprint.

Upon determining that the window of data corresponding to the end of data of storage object, Z, does not match a fingerprint or a pseudo fingerprint the server backup manager 16 stores the chunk identifying hash value, $F(Z_n)$, in the pseudo fingerprint list 26 (630). In addition, the server backup manager 16 stores the storage object chunk boundary for chunk $Z_n$ in the server memory 22 (640). The server backup manager 16 determines the chunk uniqueness hash value $H(Z_n)$ of the chunk and creates and deduplication index entry (650) in the deduplication index 20 including the chunk identity information 62, ChunkID($F(Z_n)$), the hash value 64, $H(Z_n)$, and the length of the chunk 66 $L(Z_n)$. The server backup manager also sends the chunk $Z_n$ to system storage 6 for backing up (660).

It should be appreciated that such operations can be embodied as a method implemented as an algorithm having software modules that are implemented by a computing system. Further, the method can be embodied as software on any computer readable media, as dedicated firmware, or as a combination of software and firmware, and the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that con communicate, propagate, or transport a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The term logic may include, by way of example, software, hardware, firmware, and/or combinations of software and hardware.

Figure 7:
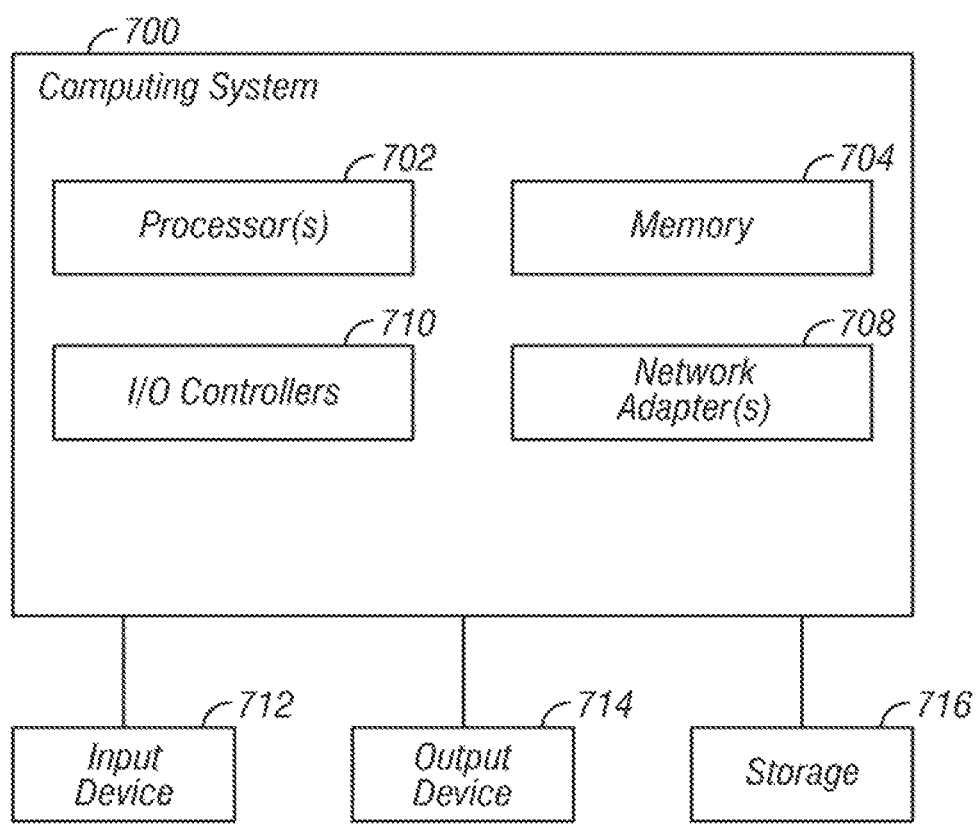
FIG. 7 illustrates a computing system that may be used in accordance with certain embodiments.

FIG. 7 illustrates a computing system 700 that may be used in accordance with certain embodiments. Client 2 and/or server 4 may implement computing system 700. The computing system 700 is suitable for storing and/or executing program code and includes at least one processor 702 coupled directly or indirectly to memory elements 704 through a system bus (not shown). The memory elements 704 may include local memory employed during actual execution of the program code, bulk storage, and cache memories which provide temporary storage of at least some program code in order to reduce the number of times code must be retrieved from bulk storage during execution. The memory elements 704 include an operating system and one or more computer programs (not shown).

Input/Output (I/O) devices 712, 714 (including but not limited to keyboards, displays, pointing devices, etc.) may be coupled to the system either directly or through intervening I/O controllers 710.

Network adapters 708 may also be coupled to the system to enable the data processing system to become coupled to other data processing systems or remote printers or storage devices through intervening private or public networks. Modems, cable modem and Ethernet cards are just a few of the currently available types of network adapters 708.

The computing system 700 may be coupled to storage 716 (e.g., a non-volatile storage area, such as magnetic disk drives, optical disk drives, a tape drive, solid state storage devices, etc.). The storage 716 may comprise an internal storage device or an attached or network accessible storage. Computer programs in storage 716 may be loaded into the memory elements 704 and executed by a processor 702 in a manner known in the art.

The computing system 700 may include fewer components than illustrated, additional components not illustrated herein, or some combination of the components illustrated and additional components. The computing system 700 may comprise any computing device known in the art, such as a mainframe, server, personal computer, workstation, laptop, handheld computer, telephony device, network appliance, virtualization device, storage controller, mobile device, for example a personal digital assistant (PDA) or mobile phone, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

The invention claimed is:

1. A computer implemented method for deduplicating a storage object comprised of a plurality of chunks of data, comprising:

determining a value of a hash of a window of data of a storage object;

determining whether the value of the hash of the window of data satisfies a predetermined mathematical property for a number indicating the window corresponds to a chunk boundary, wherein an endpoint of the chunk boundary comprises an end of a last section of the window of data satisfying the predetermined mathematical property, and wherein a starting point of the chunk boundary comprises an end of a last section of a chunk boundary of a previous chunk;

storing a storage object chunk boundary based on the window of data in response to the hash of the window of data meeting the predetermined mathematical property;

determining a new window of data in the storage object following the window of data in response to storing the storage object chunk boundary when the window of data is not an end of data of the storage object; and performing deduplication on chunks defined by stored storage object chunk boundaries.

2. The computer implemented method of claim 1, wherein the last section of the chunk boundary comprises a last byte of the window of data and wherein the last section of the chunk boundary of the previous chunk comprises a last byte of the chunk boundary of the previous chunk.

3. The computer implemented method of claim 1, further comprising:

determining whether the hash of the window of data matches one pseudo fingerprint in a list of at least one pseudo fingerprint, wherein the storing the storage object chunk boundary is performed in response to further determining that the hash of the window of data matches one pseudo fingerprint in the list of at least one pseudo fingerprint.

4. The computer implemented method of claim 3, further comprising:

storing the value of the hash of the window of data in the list of at least one pseudo fingerprint after determining that the hash of the window of data does not satisfy the predetermined mathematical property.

5. The computer implemented method of claim 4, further comprising:

determining whether the window of data comprises an end of data of the storage object in response to determining that the hash of the window of data does not match one pseudo fingerprint in the list of at least one pseudo fingerprint, wherein the value of the hash is stored in the list of at least one pseudo fingerprint in response to determining that the window of data comprises the end of data of the storage object.

6. The computer implemented method of claim 5, wherein the new window of data is determined in response to further determining that the hash of the window of data does not match one pseudo fingerprint in the list of at least one pseudo fingerprint, and wherein the value of the hash is stored in the list of at least one pseudo fingerprint in response to determining that the window of data comprises the end of data of the storage object.

7. The computer implemented method of claim 1, wherein the predetermined mathematical property is satisfied in response to making a determination consisting of one of that the value of the hash of the window of data is divisible by an integer, that the value of the hash of the window of data comprises an odd number, that the value of the hash of the window of data comprises an even number, and that the value of the hash of the window of data comprises a primer number.

8. A system for deduplicating a storage object comprised of a plurality of chunks of data, comprising:
a processor; and
a computer readable storage having program instructions executed by the processor to perform operations, the operations comprising:
determining a value of a hash of a window of data of a storage object;
determining whether the value of the hash of the window of data satisfies a predetermined mathematical property for a number indicating the window corresponds to a chunk boundary, wherein an endpoint of the chunk boundary comprises an end of a last section of the window of data satisfying the predetermined mathematical property, and wherein a starting point of the chunk boundary comprises an end of a last section of a chunk boundary of a previous chunk;
storing a storage object chunk boundary based on the window of data in response to the hash of the window of data meeting the predetermined mathematical property;
determining a new window of data in the storage object following the window of data in response to storing the storage object chunk boundary when the window of data is not an end of data of the storage object; and
performing deduplication on chunks defined by stored storage object chunk boundaries.

9. The system of claim 8, wherein the last section of the chunk boundary comprises a last byte of the window of data and wherein the last section of the chunk boundary of the previous chunk comprises a last byte of the chunk boundary of the previous chunk.

10. The system of claim 8, wherein the operations further comprise:
determining whether the hash of the window of data matches one pseudo fingerprint in a list of at least one pseudo fingerprint, wherein the storing the storage object chunk boundary is performed in response to further determining that the hash of the window of data matches one pseudo fingerprint in the list of at least one pseudo fingerprint.

11. The system of claim 10, wherein the operations further comprise:
storing the value of the hash of the window of data in the list of at least one pseudo fingerprint after determining that the hash of the window of data does not satisfy the predetermined mathematical property.

12. The system of claim 11, wherein the operations further comprise:
determining whether the window of data comprises an end of data of the storage object in response to determining that the hash of the window of data does not match one pseudo fingerprint in the list of at least one pseudo fingerprint, wherein the value of the hash is stored in the list of at least one pseudo fingerprint in response to determining that the window of data comprises the end of data of the storage object.

13. The system of claim 12, wherein the new window of data is determined in response to further determining that the hash of the window of data does not match one pseudo fingerprint in the list of at least one pseudo fingerprint, and wherein the value of the hash is stored in the list of at least one pseudo fingerprint in response to determining that the window of data comprises the end of data of the storage object.

14. The system of claim 8, wherein the predetermined mathematical property is satisfied in response to making a determination consisting of one of that the value of the hash of the window of data is divisible by an integer, that the value of the hash of the window of data comprises an odd number, that the value of the hash of the window of data comprises an even number, and that the value of the hash of the window of data comprises a primer number.

15. A computer program product for deduplicating a storage, the computer program product comprising a non-transitory computer readable storage medium having computer readable program code embodied therein that executes to perform operations, the operations comprising:
determining a value of a hash of a window of data of a storage object;
determining whether the value of the hash of the window of data satisfies a predetermined mathematical property for a number indicating the window corresponds to a chunk boundary, wherein an endpoint of the chunk boundary comprises an end of a last section of the window of data satisfying the predetermined mathematical property, and wherein a starting point of the chunk boundary comprises an end of a last section of a chunk boundary of a previous chunk;
storing a storage object chunk boundary based on the window of data in response to the hash of the window of data meeting the predetermined mathematical property;
determining a new window of data in the storage object following the window of data in response to storing the storage object chunk boundary when the window of data is not an end of data of the storage object; and
performing deduplication on chunks defined by stored storage object chunk boundaries.

16. The computer program product of claim 15, wherein the last section of the chunk boundary comprises a last byte of the window of data satisfying the predetermined mathematical property and wherein the last section of the chunk boundary of the previous chunk comprises a last byte of the chunk boundary of the previous chunk.

17. The computer program product of claim 15, wherein the operations further comprise:

determining whether the hash of the window of data matches one pseudo fingerprint in a list of at least one pseudo fingerprint, wherein the storing the storage object chunk boundary is performed in response to further determining that the hash of the window of data matches one pseudo fingerprint in the list of at least one pseudo fingerprint.

18. The computer program product of claim 17, wherein the operations further comprise:
storing the value of the hash of the window of data in the list of at least one pseudo fingerprint after determining that the hash of the window of data does not satisfy the predetermined mathematical property.

19. The computer program product of claim 18, wherein the operations further comprise:
determining whether the window of data comprises an end of data of the storage object in response to determining that the hash of the window of data does not match one pseudo fingerprint in the list of at least one pseudo fingerprint, wherein the value of the hash is stored in the list of at least one pseudo fingerprint in response to determining that the window of data comprises the end of data of the storage object.

20. The computer program product of claim 19, wherein the new window of data is determined in response to further determining that the hash of the window of data does not match one pseudo fingerprint in the list of at least one pseudo fingerprint, and wherein the value of the hash is stored in the list of at least one pseudo fingerprint in response to determining that the window of data comprises the end of data of the storage object.

21. The computer program product of claim 15, wherein the predetermined mathematical property is satisfied in response to making a determination consisting of one of that the value of the hash of the window of data is divisible by an integer, that the value of the hash of the window of data comprises an odd number, that the value of the hash of the window of data comprises an even number, and that the value of the hash of the window of data comprises a primer number.

* * * * *